United States Patent [19]
Coibion

[11] 4,032,695
[45] June 28, 1977

[54] CYLINDRICAL ELECTRIC CELL

[75] Inventor: Jean Coibion, Tresses, France

[73] Assignee: Saft-Societe des Accumulateurs Fixes et de Traction, Romainville, France

[22] Filed: June 9, 1976

[21] Appl. No.: 694,438

[30] Foreign Application Priority Data
June 30, 1975 France .............................. 75.20496

[52] U.S. Cl. ................................ 429/94; 429/133; 429/161; 429/178

[51] Int. Cl.² ......................................... H01M 4/00

[58] Field of Search ............ 429/94, 133, 161, 164, 429/165, 178

[56] References Cited
UNITED STATES PATENTS

| | | | |
|---|---|---|---|
| 3,490,951 | 1/1970 | George | 429/94 X |
| 3,576,678 | 4/1971 | Kocherginsky et al. | 429/164 |
| 3,761,314 | 9/1973 | Cailley | 429/94 |
| 3,775,182 | 11/1973 | Patton et al. | 429/94 |
| 3,776,777 | 12/1973 | Houpert et al. | 429/94 X |
| 3,796,606 | 3/1974 | Lehmann et al. | 429/94 |

*Primary Examiner*—C. F. Lefevour
*Attorney, Agent, or Firm*—Kenyon & Kenyon, Reilly, Carr & Chapin

[57] ABSTRACT

The invention relates to electric cells which may comprise, for example, two trough-shaped elementary units mounted in a casing, each elementary unit comprising a relatively concavo-convex or trough-shaped positive electrode of compressed, plastified or sintered material, tightly sandwiched between two thin concavo-convex trough-shaped negative electrode parts obtained by folding a single electrode sheet around the positive electrode. Application of the invention is non-exclusively to alkaline storage cells.

10 Claims, 9 Drawing Figures

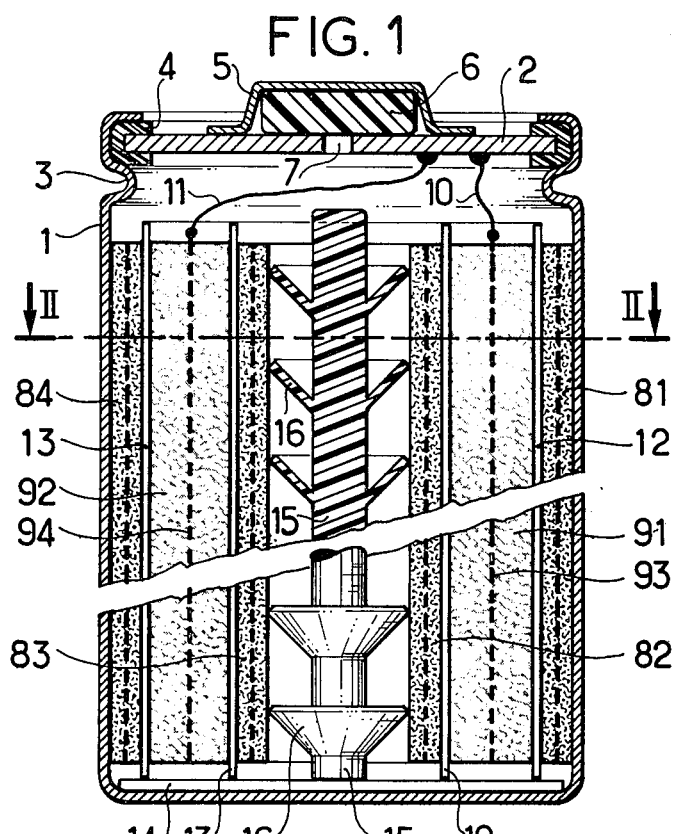
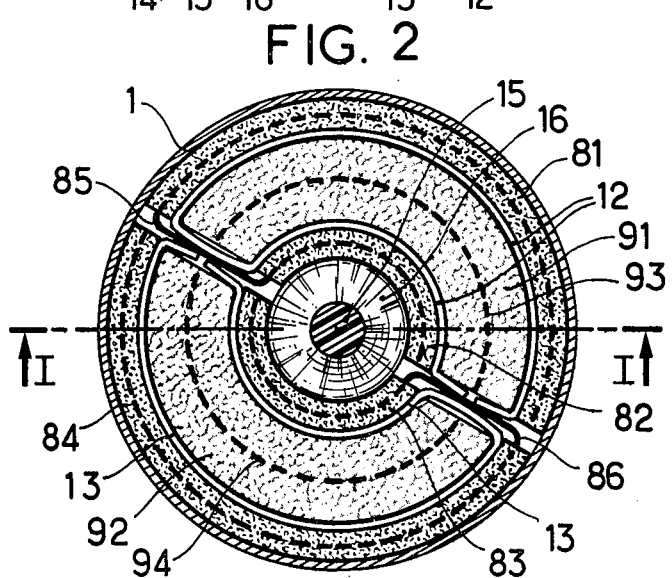
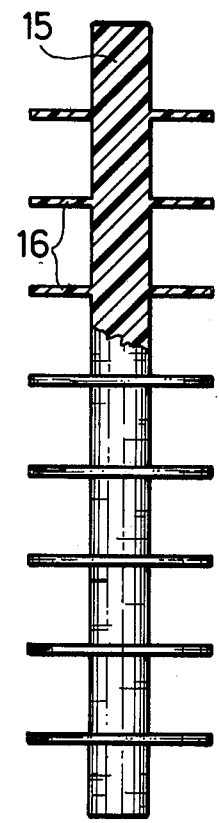

CYLINDRICAL ELECTRIC CELL

RELATED APPLICATIONS

No related applications are co-pending.

BACKGROUND OF THE INVENTION

This invention relates to cylindrical electric cells and is particularly, but not exclusively, applicable to alkaline storage cells.

Such storage cells are known in which the electrodes of the thin sintered carrier type are wound in a spiral with one or two interleaved separators. This technology, while enabling the production of storage cells capable of supplying high currents is nevertheless fairly expensive and becomes relatively more expensive as the dimensions of the storage cell are decreased.

There have been proposals to use relatively thicker electrodes in the form of coaxial cylinders which are alternatively positive and negative, the number of coaxial layers of one polarity being then limited to one or two and each cylindrical layer being made of a plurality of cylindrical arcs, for example, two half-cylinders in order to facilitate assembly. A central current collector formed by a metal plate folded in a V, acts as a terminal of one polarity while at the same time urging the half-cylinders radially outwards against one another and against a metal casing which acts as an outer terminal of the other polarity. A disadvantage of such a cell is that the end innermost and outermost electrodes (in the center and at the periphery) have a low efficiency since they are relatively thick and operate with one face only, i.e. the respective faces adjoining the electrodes of opposite polarity.

An object of the present invention is to mitigate this disadvantage at reasonable cost.

BRIEF SUMMARY OF INVENTION

The present invention provides a cylindrical electric cell comprising a casing containing a plurality of parallel-connected elementary units each of which is concavo-convex or trough-shaped and extends over a portion of the arc of a cylinder, the elementary units being juxtaposed within the casing to obtain a substantially entire cylinder with appropriate connections being made between electrodes of the elementary units and the terminals of the cell, wherein each elementary unit comprises a relatively thick concavo-convex or trough-shaped, positive electrode tightly sandwiched with interleaved layers of separator material between inner and outer relatively thin, concavo-convex, trough-shaped, negative electrode parts which are electrically interconnected.

The thick positive electrode (having, for example, a thickness of 1 to 3 mm) is thus surrounded on both its faces, by a thin negative electrode (having a thickness of less than 1 mm) and so operates with high efficiency.

In a preferred embodiment, the elementary units are substantially half cylinders and, consequently, there are two of them in the casing or can.

The positive electrode can be of the compressed type and in that case will, to great advantage, be directly compressed into its concavo-convex shape, or of the plastified type, i.e. in which the active material, to which an electric conductor may be added in divided form, is mixed with a binding agent and pasted on a current collector. The plastified type of electrode will preferably be shaped to requisite concavo-convex form after manufacture as a plane electrode.

The negative electrode parts are also concavo-convex in shape and preferably of the thin sintered carrier type and are preferably connected together by a portion of their common collector free from sintered material folded along an end edge of the arcuate positive electrode, and preferably coated with an insulating material such as insulative varnish at that portion.

In another embodiment, the cell comprises at least two coaxial cylindrical sets of elementary concavo-convex or arcuate units having the same height but different diameters with at least one outer set surrounding one inner set.

In order to keep the positive and negative electrodes closely pressed against each other, the sets pressed against each other and the outer set pressed against the casing which can be made of metal and can be used as a negative current collector, the central axially extending tubular space of the cell can be occupied by an insulating rod equipped with resiliently deformable fins which exert an outwardly directed force on the sets when inserted into said space.

Embodiments of the present invention are described by way of example with reference to the accompaying drawings in which:

FIG. 1 is a longitudinal sectional view of a cell embodying the invention in cross-section taken along a line I—I of FIG. 2;

FIG. 2 is a horizontal cross-section of the cell of FIG. 1 along the line II—II of FIG. 1;

FIG. 6 is a partial cross-section view of an insulating rod shown in FIG. 1, but before assembly in the cell.

DETAILED DESCRIPTION

Figure 3A:
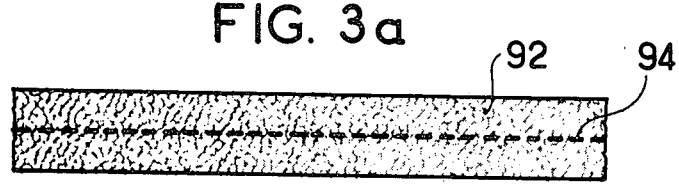
FIG. 3a is a cross-section of a positive electrode of the plastified type before shaping.

The examples of the invention described are of alkaline nickel-cadmium storage cell. The invention also is applicable to other types of electrical cells.

In FIG. 1, the cell has a cylindrical casing 1 made of nickel-plated steel. It is closed at its upper part by a cover 2, also made of nickel-plated steel, which rests on a shoulder defined by an inwardly projecting groove 3 formed at the upper part of the casing 1. An insulative sealing ring 4 surrounds the periphery of the cover 2 and serves to insulate it electrically from the casing 1. The upper rim part of the casing 1 is turned down onto the sealing ring 4 after assembly of the cells components therein and ensures a fluid-tight seal by pressing the assembled sealing ring 4 and cover 2 against the shoulder defined by the groove 3. The cover 2 supports a valve which comprises a metal cap 5, welded to the cover 2, and containing an elastomer disk 8 plugging a hole 7 formed in the center of the cover 2. The cap 5 serves as one of the cell terminals. All these arrangements are well-known and do not form a part of the invention.

Referring to FIGS. 1 and 2, the casing 1 contains two elementary units electrically connected in parallel. Each of the elementary units is concavo-convex or trough-shaped, extending over an arc of substantially 180° and comprises a positive electrode 91 or 92 respectively sandwiched in the radial direction between an inner negative ultimately concavo-convex electrode part 82 or 83 and on outer ultimately concavo-convex negative electrode part 81 or 84. The corresponding inner and outer negative electrode parts, 82 and 81 or 83 and 84 are electrically interconnected by portions 85 and 86 as will be presently described. The outer convex surfaces of negative electrode parts 81 and 84 are pressed against the inner convex surface of the wall of the casing 1 by the action of radially-resilient fins 16 of insulating rod 15 which occupies the tubular axially extending space in the casing 1 defined by assembled units in said casing and which fins urge the elementary units outwardly, thus providing mechanical support for the units in the casing 1 as well as promoting the electrical connection between the casing 1 and the abutting convex surfaces of the negative electrode parts 81 and 84. The positive electrodes 91 and 92 are electrically connected to the cover 2 and hence to the positive terminal cap 5, by respective leads 10 and 11.

The negative electrode parts are made of pulverulent nickel layers sintered on a core of perforated metal foil and impregnated with active material. Corresponding pairs of negative electrode parts 81 and 82 or 83 and 84 share the same metal core 85 or 86 which provides the electrical connection between the parts of each pair. The base or sinter free portion of the metal core 85 or 86 which interconnects the corresponding pairs of negative electrode parts is folded around one of the straight or end edges of the positive electrode 91 or 92. These bare portions of the metal cores 85 and 86 are preferably and advantageously coated with an insulating varnish or the like to prevent short circuits to the positive electrodes.

The positive electrodes 91 and 92 are made of plastified material pasted on respective current collecting cores 93 and 94 which are electrically connected to the leads 10 and 11.

The respective positive electrode and negative electrode parts of each elementary unit are separated by separators 12 and 13 which fold round the same straight end edges of the positive electrodes 91 and 92 respectively as the edges round which the metal cores 85 and 86 of the negative electrode parts are folded. It will be observed, in FIG. 2, that even if the ends of the separators 12 and 13 surrounding the positive electrodes are long enough to fold around the opposite edges of the positive electrodes there is nevertheless a danger of short circuiting with the bare portion of the negative electrode of the other elementary unit (i.e. the positive electrode 92 may short to the negative electrode core 85 and similarly 91 to 86) hence it is preferable as has been said above, to coat these bare portions with an insulating varnish. Moreover, if this precaution is not taken, there is further risk of these bare portions becoming a seat of gas evolution which is to be avoided, especially in sealed storage cells.

The bottom of the casing 1 is provided with an insulating washer 14 which prevents any contact between the positive electrodes 91, 92 and the casing 1.

An insulating rod 15 is made of plastic material and is provided with deformable fins 16 which are compressed into the form of truncated cones whose generator lines are slightly curvilinear when the rod is installed in the tubular space of the casing 1 defined by the innermost concave surfaces of the innermost negative electrode, and which fins or disks 16 provide the above-mentioned radially outward resilience.

FIGS. 3a to 5 show different components of an elementary unit at various stages of assembly.

Figure 3B:
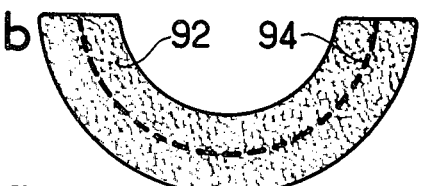
FIG. 3b is a cross-section view of the positive electrode of FIG. 3a after shaping to arcuate form.

FIG. 3a is a cross-sectional view of the positive electrode 92 taken perpendicular to its longest side. A mixture of nickel hydroxide, graphite (or nickel powder) and a binding agent such as polytetrafluoro-ethylene is pasted on the current collecting core 94 which is, for example, made of expanded metal such as nickel-plated steel. The final thickness of the electrode is 2 to 3 millimeters. The electrode is then arcuately shaped into a concavo-convex or trough-shaped half cylinder as shown in FIG. 3b. Positive electrode 91 is similarly made and shaped. Lead wires 10 and 11 are respectively provided for cores 93 and 94 of said positive electrodes 91 and 92.

Figure 4A:
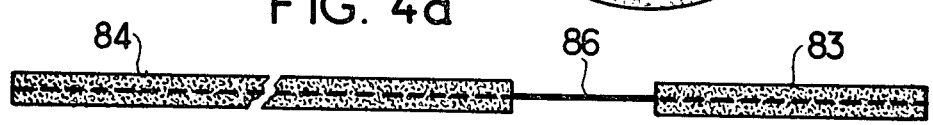
FIG. 4a is a cross-section view of a negative electrode after sintering and impregnation but before shaping.
Figure 4B:
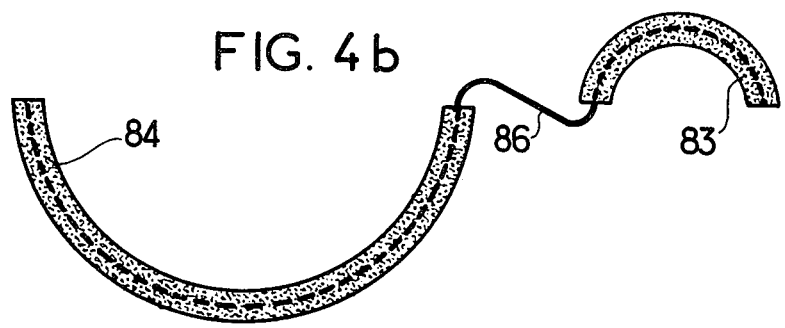
FIG. 4b is also a cross-section view of the negative electrode of FIG. 4a after arcuate shaping of parts intended to form inner and outer negative electrode components adapted to lie respectively in the concave and surround the convex faces of the arcuate positive electrode.
Figure 5:
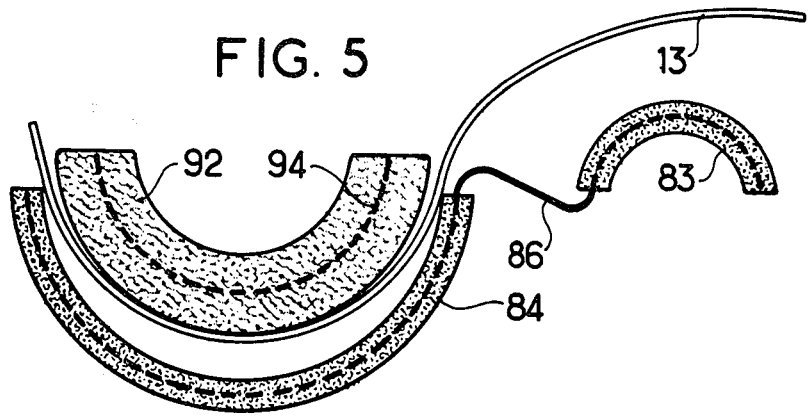
FIG. 5 shows an intermediate stage in the assembly of the shaped electrodes of FIGS. 3b and 4b.

FIG. 4a is a cross-sectional view of the parts 83 and 84 of the negative electrode such as they are after impregnation, (and after severing from a continuous length, if they are obtained through a continuous method). As shown, the sintered parts 84 and 83 borne by the nickel-plated foil collector 86 are separated by a bare portion of the foil which has been bared as by wiping off therefrom in portion 86 after coating with nickel powder and before the sintering operation. The electrode is then impregnated by the usual methods with cadmium hydroxide. The arcuate shaping of the respective parts 84 and 83 of this unit does not cause any difficulty since the thickness of the negative electrode parts 83 and 84 is about 0.7 mm. As shown in FIG. 4b the concave surfaces or troughs of the concavo-convex half cylinders 84 and 83 face in opposite directions. Half cylinder 83 is dimensioned to fit into the concave surface of a positive electrode e.g. 92, while half cylinder 84 is dimensioned to fit around the convex surface of said positive electrode. FIG. 5 shows the assembling of the positive half-cylinder electrode 92 with the negative electrode parts to form one of the elementary units. As shown, the separator 13 is first placed in the concave trough of the negative half cylinder 84, allowing a much greater length of separator to over-hang on the side of the part 86 than on the opposite side. The positive electrode 92, whose convex surface must closely engage the concave face of the negative electrode part 84 covered by the separator 13, is then positioned thereon. The half cylinder part 83 is then turned down together with the overhanging part of the separator 13, so as to locate itself in the concave trough of the half cylinder positive electrode 92, it being necessary for the convex face of the half cylinder negative electrode part 83 closely to engage the concave face of the positive electrode 92 when lined with the separator 13. The other elementary unit consisting of positive electrode 91 surrounded by separator 12 and sandwiched between negative electrode parts 81 and 82 is similarly assembled. The assembled elementary units are then placed in the casing 1, portions of the groove 3 being of slight depth to facilitate insertion of said units into the casing. The leads 10 and 11 are welded to protruding parts of the positive current collecting cores 93 and 94 and to the cover 2 which is already fitted with the sealing ring 4. The requisite electrolyte is added to the casing and then the rod 15 is inserted in the center of the casing 1.

The rod 15 is shown in a cross-sectional view in FIG. 6 before insertion into the axially extending tubular space within casing 1. This rod 15 is made of insulative plastic material provided with thin circular discs or fins 16 projecting perpendicular to its axis, thus allowing it to be directly manufactured as by moulding. These discs or fins 16 having an outside diameter greater than that of the hollow axial tubular space defined by the concave sides of the half cylinder negative electrode parts 82 and 83 they deflect during insertion of rod 15 into said space and thereby exert a centripetal bearing force on the two elementary units in the casing so that the electrodes of each unit are pressed hard against each other and the outermost faces of the outermost negative electrode parts 81 and 84 are pressed hard against the inner wall of the casing 1, thus insuring good electrical contact therewith. The cover 3 is then placed in position and a crimping opertion is performed on the upper edge of the cup or casing 1 to crush the sealing ring 4 against the shoulder defined by the groove, thus completing the cycle of operations of the cell.

Figure 7:
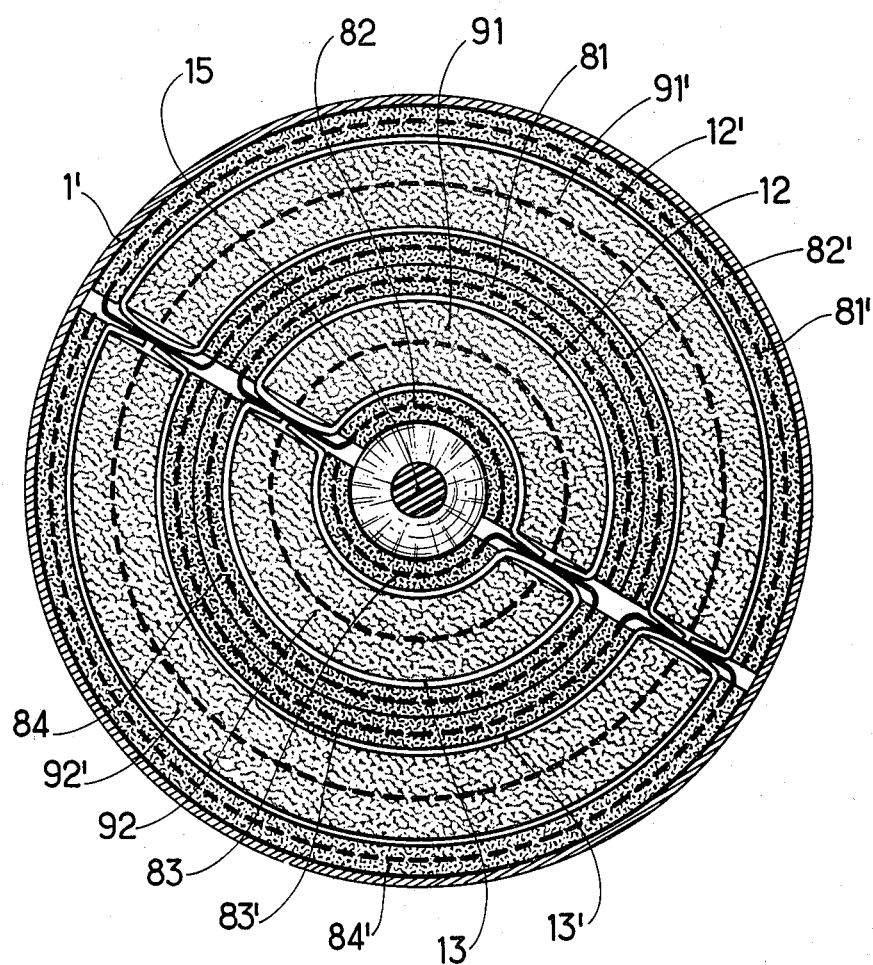
FIG. 7 is a horizontal cross-section of another embodiment of a cell according to the invention.

If storage cells having a higher cpacity and a larger diameter are required, another analogous set of elementary units, whose inside diameter is equal to the outside diameter of the first described set is disposed concentrically around the first set. This is depicted in FIG. 7 in which the same reference characters as in FIG. 2 have been given to the same parts of the innermost set of elementary units. A second set, also made of two units, concentrically surrounds the first set, the concave trough of the innermost negative half cylinders 82' and 83' of this outer set is in contact with the convex face of the outermost negative half cylinders 84 and 81 of the inner set, the two sets then being coaxial. The positive electrodes 91' and 92' are sandwiched between the negative electrode parts 82' and 81', 83' and 84' respectively and provided with the interleaved separators 12' and 13'. The two sets are urged outwardly against each other and the second set is urged against the casing 1 by the pressure exerted by the fins 16 of central rod 15.

Of course, additional sets such as a third set or more could be added to the first two in the same way for still larger cells. However, the invention is more particularly advantageous for application to cells having a small diameter.

While specific embodiments of the invention have been described and shown, variations in structure within the scope of the appended claims are possible and are contemplated. There is no intention of limitation to the exact disclosure herein presented.

What is claimed is:
1. A cylindrical electric cell comprising a metallic casing containing a plurality of parallel connected concavo-convex elementary units each of which is trough-shaped and dimensioned to extend over a portion of the arc of a cylinder, the elementary units being juxtaposed within the casing to define a substantially complete cylinder, terminals for said cell, electrical connections between electrodes of the elementary units and the terminals of the cell, each elementary unit comprising a pair of relatively thin negative electrode parts, separator material and a relatively thick, trough-shaped, positive electrode, said positive electrode being tightly sandwiched in the radial direction with interleaved separator material between inner and outer relatively thin, trough-shaped, negative electrode parts of said pair, said parts being electrically interconnected, and means for expanding said units radially outwardly toward said casing.

2. A cell according to claim 1, including a single metal foil common to both the negative electrode parts of each elementary unit, said foil being folded around one of the straight edges of the positive electrode and serving as the said electrical interconnection between the negative electrode parts.

3. A cell according to claim 1, wherein the said plurality of elementary units is constituted by two elementary units.

4. A cell according to claim 1 including at least two coaxial concentric sets each comprising said elementary units juxtaposed so that each set forms a substantially complete cylinder, one lying within the other.

5. Cell according to claim 1, wherein the positive electrode is of the compressed type.

6. A cell according to claim 1, wherein the positive electrode is of the plastified type.

7. A cell according to claim 1, wherein the negative electrode is of the thin sintered type.

8. A cell according to claim 1 said last-named means comprising in addition an insulating rod having resiliently deformable means, said rod being located internally of said casing within a space defined by the concave innermost negative electrode part, said deformable means serving to exert an outwardly directed force on the said elementary sets thereby ensuring that they are tightly pressed against each other and against the inside wall of the casing.

9. An electrochemical cell comprising a metallic casing having a concave inner surface, a plurality of parallel connected elementary concavo-convex shaped units each dimensioned to have its convex surface complementary in shape to a portion of the said inner concave surface of said container, said elementary units being juxtaposed within said casing to cover substantially the said entire inner surface with their respective convex surfaces, each of said elementary units comprising a layer of separator material and a pair of relatively thin trough-shaped electrically interconnected negative electrodes, a positive electrode, said positive electrode being sandwiched in the radial direction between said pair of negative electrodes with said layer of separator material positioned between said negative electrodes and said positive electrode, terminals for said cell, means connecting said negative and positive electrodes to respective of said terminals, and means positioned within said casing radially to bias the outermost negative electrode of each unit against said inner surface of said casing and the electrodes of each unit toward each other.

10. An electrochemical cell according to claim 9 wherein concave surfaces of said units define an axially disposed space within said container and including a rod of insulative material positioned in said space, said rod having deformable fins bearing against said conave surfaces of said units to exert an outwardly directed force against units to press tightly the electrodes of each unit against each other and also said units against the inner surface.

* * * * *